United States Patent
Jia et al.

(10) Patent No.: US 7,397,939 B2
(45) Date of Patent: Jul. 8, 2008

(54) METHOD AND APPARATUS FOR AUTOMATIC REMOVAL OF OPTICAL ARTIFACTS IN SCANNING

(75) Inventors: Charles Jia, San Diego, CA (US);
Laura Zhou, San Diego, CA (US);
Stanley McDaniel, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1219 days.

(21) Appl. No.: 10/641,690

(22) Filed: Aug. 14, 2003

(65) Prior Publication Data
US 2004/0042682 A1 Mar. 4, 2004

Related U.S. Application Data

(60) Provisional application No. 60/407,497, filed on Aug. 30, 2002.

(51) Int. Cl.
*G06K 9/00* (2006.01)
*G06K 9/40* (2006.01)

(52) U.S. Cl. .................. 382/141; 382/162; 382/165; 382/167; 382/275

(58) Field of Classification Search .............. 382/100, 382/112, 141–152, 162–167, 209–213, 274–275
See application file for complete search history.

(56) References Cited

U.S. PATENT DOCUMENTS

| 5,181,081 | A | * | 1/1993 | Suhan ....................... 356/394 |
| 5,875,028 | A | * | 2/1999 | Lasken et al. ............... 356/244 |
| 6,041,703 | A | * | 3/2000 | Salisbury et al. ............. 101/37 |
| 7,295,696 | B2 | * | 11/2007 | Levi et al. .................. 382/145 |
| 2001/0035886 | A1 | | 11/2001 | Bradshaw et al. | |

FOREIGN PATENT DOCUMENTS

| EP | 0474002 | 11/1992 |
| WO | WO9810241 | 12/1998 |

* cited by examiner

*Primary Examiner*—Matthew C. Bella
*Assistant Examiner*—Wes Tucker

(57) ABSTRACT

A system and method for removing optical iridescent artifacts in an image includes scanning an article having a transparent and reflective surface to create the image, identifying potential optical iridescent artifacts in the image resulting from the scan using a search pattern on the image of the article, confirming through a color analysis operation that the potential optical iridescent artifacts discovered along the search pattern are optical iridescent artifacts and not printed on the article and removing the confirmed iridescent artifacts from the image.

24 Claims, 6 Drawing Sheets

METHOD AND APPARATUS FOR AUTOMATIC REMOVAL OF OPTICAL ARTIFACTS IN SCANNING

CROSS REFERENCE TO RELATED APPLICATIONS

This application claims priority to Provisional Application Ser. No. 60/407,497 filed by Hewlett-Packard Company Aug. 30, 2002 entitled "Method for Automatic Removal of Optical Artifacts in Scanning" and is incorporated by reference herein.

BACKGROUND OF THE INVENTION

The present invention relates to scanning and printing. Optical storage media has become a convenient and economic way of archiving and backing data, music and video; the typical optical media includes compact disc (CD) media and digital video disc (DVD) media and many other variants. As a result of a growing popularity, the price of CD media, DVD media and similar media along with the associated devices for writing and reading these media types has become well within the reach of most consumers and users. Indeed, a majority of computers being shipped come with at least one device for creating archives and backups of data, music and videos on these disks. They often include powerful software for organizing and writing or "burning" this information onto these disks and stickers for stamping or labeling the disks.

To readily identify a CD or DVD, a great number of users have resorted to scanning the printed side of an original disk with a scanner or scanning device and then printing the images onto stickers to then label the archive or backup copy. In many cases, the accuracy of the image reproduction depends on the resolution and quality of the scanner and printer combination. If a user's original CD or DVD becomes lost or damaged the backup version not only contains the same information but also appears visually similar.

Some images printed on the CD media or DVD media do not cover the entire print side of the media and leave certain areas exposed. These exposed areas typically show the translucent material that makes up the disk media as well as the reflective metallic undercoat sandwiched between different layers of the material. Unfortunately, lights emitted from the scanners reflect off the reflective material during scanning and creates optical iridescent artifacts. In some cases, the optical iridescent artifacts are identified as rainbow artifacts as they appear to generate a rainbow of colors on the image. These optical iridescent artifacts are a result of the thin film interference caused when the light reflects off different layers of the CD. Currently, the optical iridescent artifacts reduce the quality of the printed output as conventional scanner and printer devices are not capable of eliminating the effect.

DETAILED DESCRIPTION

Aspects of the present invention provide one or more of the following advantages used in image processing and printing. Graphic content printed on compact disc (CD) media, digital video disc (DVD) and other similar media types can be scanned and printed without optical iridescent artifacts. The optical iridescent artifacts typically occur on CD, DVD and other transparent yet reflective articles during scanning due to the thin-film light interference caused by the particular material or article. Implementations of the present invention eliminates these optical iridescent artifacts created during scanning allowing improved reproductions of the graphic content printed on the CD, DVD or other article.

In addition, the present invention distinguishes between printed content on the particular article and optical iridescent artifacts created through the scanning process. Optical iridescent artifacts are eliminated while other content printed on the CD/DVD or other article remains intact. This selectively eliminates the optical iridescent artifacts while preserving colorful content typically printed on the surface of the article being scanned.

Figure 1:
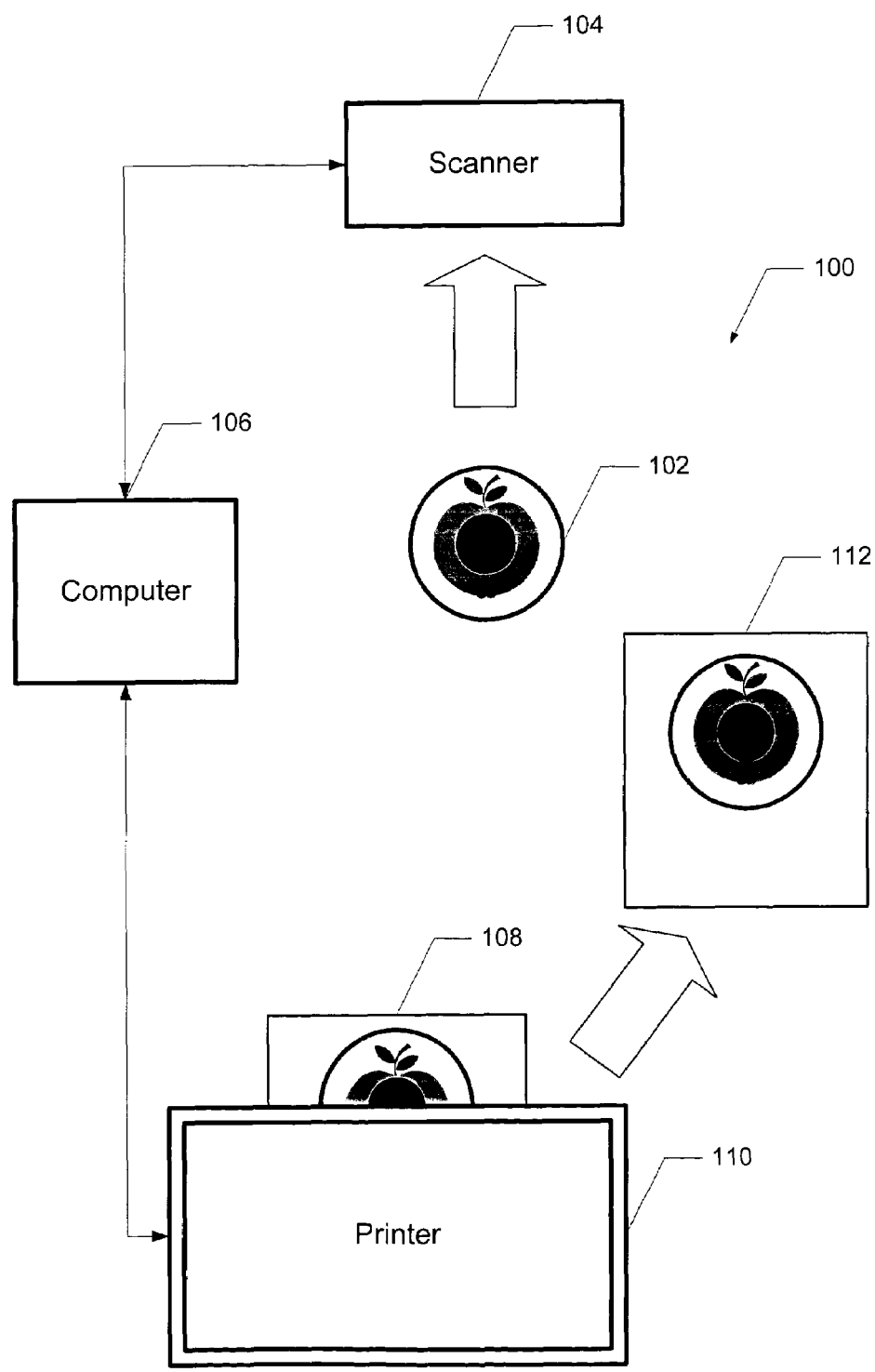
FIG. 1 is a block diagram of a scan and print system designed in accordance with one implementation of the present invention.

FIG. 1 is a block diagram of a scan and print system designed in accordance with one implementation of the present invention. Scan and print system 100 includes a CD 102, a scanner 104, a computer 106, a printer 108 and label sheet 112. Instead of CD 102, alternate implementations may be applied to DVDs or other articles having a transparent and reflective surface that tends to create optical iridescent artifacts.

CD 102 is scanned to obtain content and artwork typically printed on the surface of CD 102. The content typically includes decorative and aesthetic elements in monochromatic or color as well as useful textual information. If CD 102 includes music then the content may include a logo or photograph associated with the artist and a list of the songs on the compilation. For example, CD 102 in FIG. 1 has an image of an apple printed on the surface and is surrounded by the transparent and reflective material used to make CD 102. In one implementation, a polycarbonate material is used to construct CD 102 and the reflective quality results from an aluminum coating on the polycarbonate material.

CD 102 is positioned on a glass platen in scanner 104 in preparation for scanning the content on the print side of the CD. Scanner 104 typically shines a light passing through the glass platen and onto the surface of CD 102. The reflection from the surface of CD 102 is digitally recorded by scanner 104 as a matrix of values referenced using a Cartesian coordinate system and representing a digital image.

Areas on the surface of CD 102 not covered with content tend to reflect the light from scanner 104 adding an optical iridescent artifact to the digital image. As previously described, optical iridescent artifacts are the result of an interference pattern created from the thin films on CD 102. Computer 106 processes the matrix of values representing the digital image using image processing software designed in accordance with implementations of the present invention that removes the optical iridescent artifacts. In addition, the image processing software may perform other image processing functions to enhance the content and corresponding matrix of values including smoothing, sharpening and other image enhancement operations.

Printer 110 prints the digital image once implementations of the present invention and other image processing operations have been completed. Content from the surface of CD 102 is reproduced and printed on general purpose paper or special paper containing a sticker in the shape of CD 102. In the example depicted in FIG. 1, sticker 112 includes one sticker in the shape of CD 102 having a copy of the content printed on CD 102 without the effects of the optical iridescent artifacts. This sticker can be placed directly on a backup or archive copy of CD 102 thereby maintaining both the aesthetic and informational aspects provided with the content as originally found on CD 102. Alternate implementations, may print a digital image multiple times on one sheet containing multiple stickers for multiple archive copies of CD 102. Different printers may print sticker 112 with different resolutions depending on the quality of the output desired and the time allocated to printing the content on the stickers.

Figure 2:
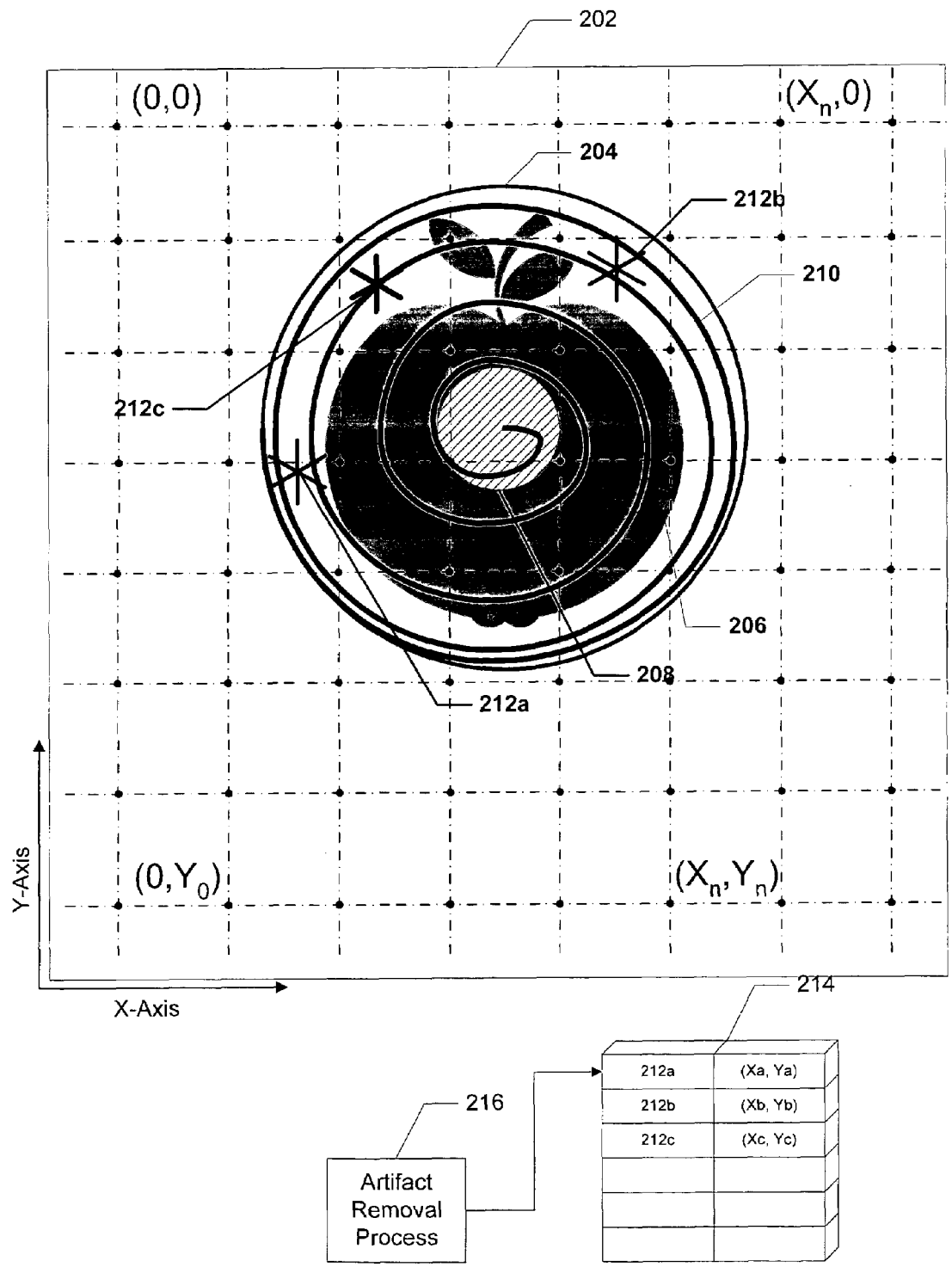
FIG. 2 is a schematic diagram of the resulting image scanned from the surface of a CD and processed in accordance with one implementation of the present invention.

FIG. 2 is a schematic diagram of the resulting image scanned from the surface of a CD and processed in accordance with one implementation of the present invention. Scanned image 200 represents a logical representation of the image after it is scanned and before it is printed by a printer. Accordingly, in this example scanned image 200 includes a grid 202 with Cartesian coordinate points as illustrated, a CD image 204, a graphic content 206, a spindle area 208 within CD image 204, a logical spiral 210, and potential optical iridescent artifacts 212a-c. As previously described, potential optical iridescent artifacts are further analyzed to determine with a high-likelihood that these in fact are artifacts and not actually printed on CD image 204.

In this example, CD image 204 is taken from a music compact disc having an apple logo imprinted on a print surface of the CD. Areas outside the apple logo without printed material, hereinafter "outside areas", are not covered with paint or other material and remain exposed. These outside areas on CD image 204 correspond to the transparent and reflective areas on the original CD and, as previously described, may contain several potential optical iridescent artifacts 212a, 212b and 212c when the material is exposed to the light source in a scanner.

Image processing techniques designed in accordance with the present invention discover these optical iridescent artifacts by tracing CD image 204 along logical spiral 210. In one implementation, a search window (not shown) N-units wide and M-units high samples blocks of pixels along logical spiral 210. For example, a 10-pixel by 12-pixel search window. The dimensions of the search window depend on the resolution of the image being processed and the hardware and software resolution capabilities of the equipment being used.

Each potential optical iridescent artifact 212a, 212b and 212c is identified using Cartesian coordinates along grid 202 and then analyzed during a post-processing phase. The subsequent post-processing analysis determines through color analysis if a potential optical iridescent artifact is an actual optical iridescent artifact or part of CD image 204 printed on the original CD surface. Also, it is possible removing one actual iridescent artifact removes several potential iridescent artifacts that were part of the larger iridescent artifact. For these and other reasons, the potential iridescent artifacts are gathered together in a first pass and then collectively analyzed and removed through a subsequent set of operations.

Figure 3:
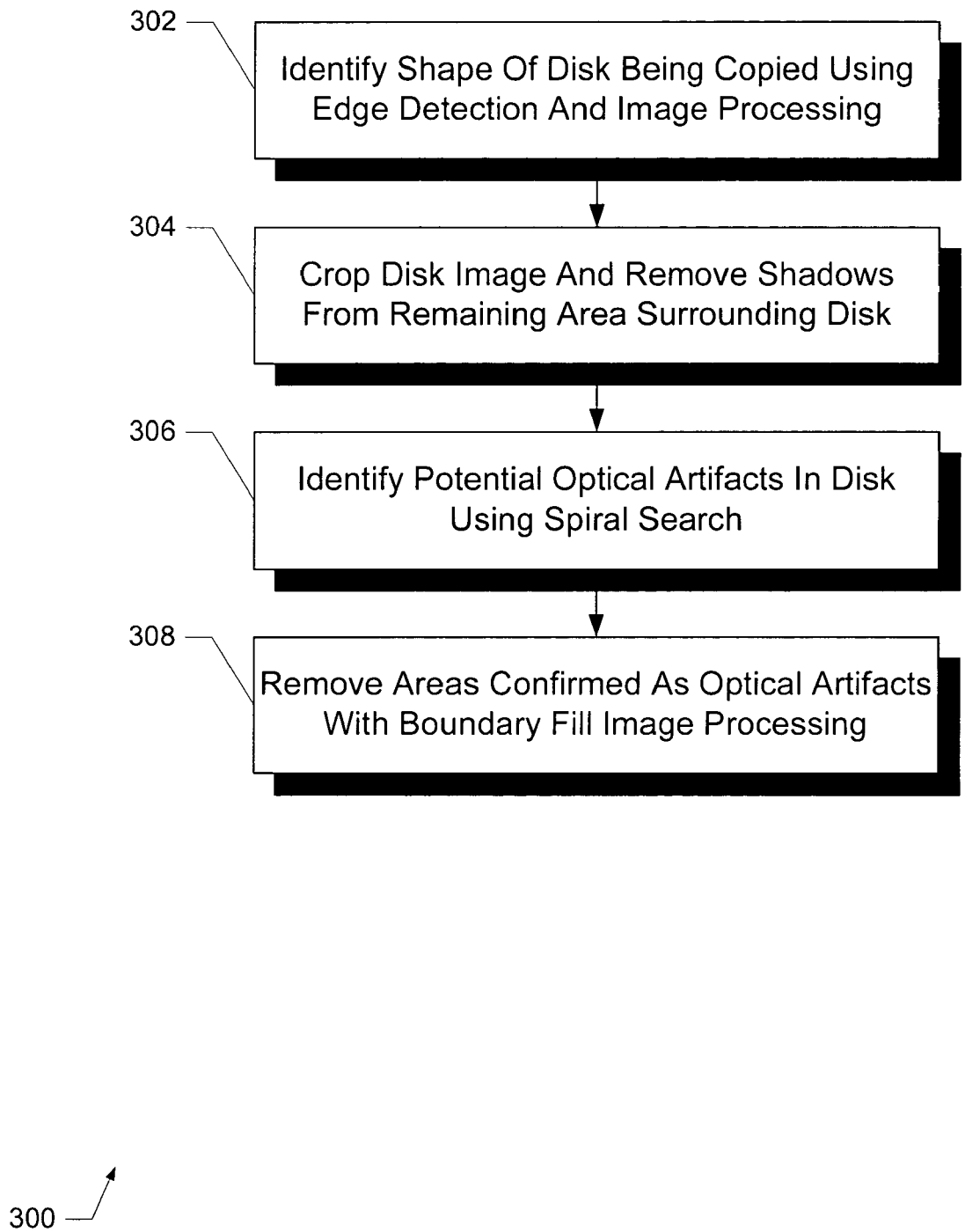
FIG. 3 is a flowchart diagram of the overall operations for identifying and removing optical iridescent artifacts from an image in accordance with one implementation of the present invention.

FIG. 3 is a flowchart diagram of the overall operations for identifying and removing iridescent optical artifacts from an image in accordance with one implementation of the present invention. These operations assume that the image is created by scanning an article having a transparent and reflective surface. Articles of particular interest in the present invention include CDs typically used to hold music and DVDs for storing video. Alternate implementations may include other types of media with different formats and physical dimensions that also having both a transparent and reflective surface and/or have optical iridescent artifacts. Accordingly, references made to a CD or disc describe should not limit application of the present invention as many different implementations of the present invention can be created to work with scanning many different articles having transparent and reflective surfaces.

Referring to FIG. 3, the initial step includes identifying the shape of disk being copied using edge detection and image processing (302). In many cases, edge detection can determine or suggest that a CD or article being scanned is one of several different physical formats based on the relative size of the article, diameter of the disc as compared with standard available media formats. With this information, a user or operator can often either select or confirm that the article being scanned has the standard format and specific size being suggested or provide customized dimensions for unusual shapes.

Size and shape information is then used to crop the disk image and remove shadows from remaining area surrounding disk (304). This step ensures that subsequent operations are performed on the area of interest and not outside the area being reproduced. For example, cropping the disk image includes identifying a center spindle area in the interior of the CD as well as outer circumference of the CD defining the overall size and shape of the CD. In one implementation, cropping and cleanup is performed in accordance with U.S. Pat. No. 6,430,320 entitled "IMAGE PROCESSING SYSTEM WITH AUTOMATIC IMAGE CROPPING AND SKEW CORRECTION" by Jia et al. and U.S. Pat. No. 5,901,253 entitled, "IMAGE PROCESSING SYSTEM WITH IMAGE CROPPING AND SKEW CORRECTION" by Tretter et al.; both patents are assigned to the assignee of the present invention.

Implementations of the present invention are then used to identify potential optical iridescent artifacts in the image using a spiral search pattern (306). Potential optical iridescent artifacts are gathered together for more detailed analysis before they are considered actual artifacts. For example, the analysis may include various types color analysis or other types of image processing analysis as described in further detail later herein. What appears to be an optical iridescent artifact may be part of the image on the CD or be part of a larger optical iridescent artifact. In some cases, removing one optical iridescent artifact may remove other related artifacts due to their proximity.

Areas confirmed to be artifacts in accordance with the present invention are then removed using boundary fill image processing or other similar methods (308). Optical iridescent artifacts are removed to enable the scanned image to be printed with a higher quality of reproduction. In this context, boundary fill processing is used to carefully identify groups of pixels forming the optical iridescent artifact and fill them with different colors to blend in with the images or the background of the image as appropriate. The resulting image is then printed on stickers and placed on archive CD copies or other locations with the optical iridescent artifacts removed in accordance with the present invention.

Figure 4:
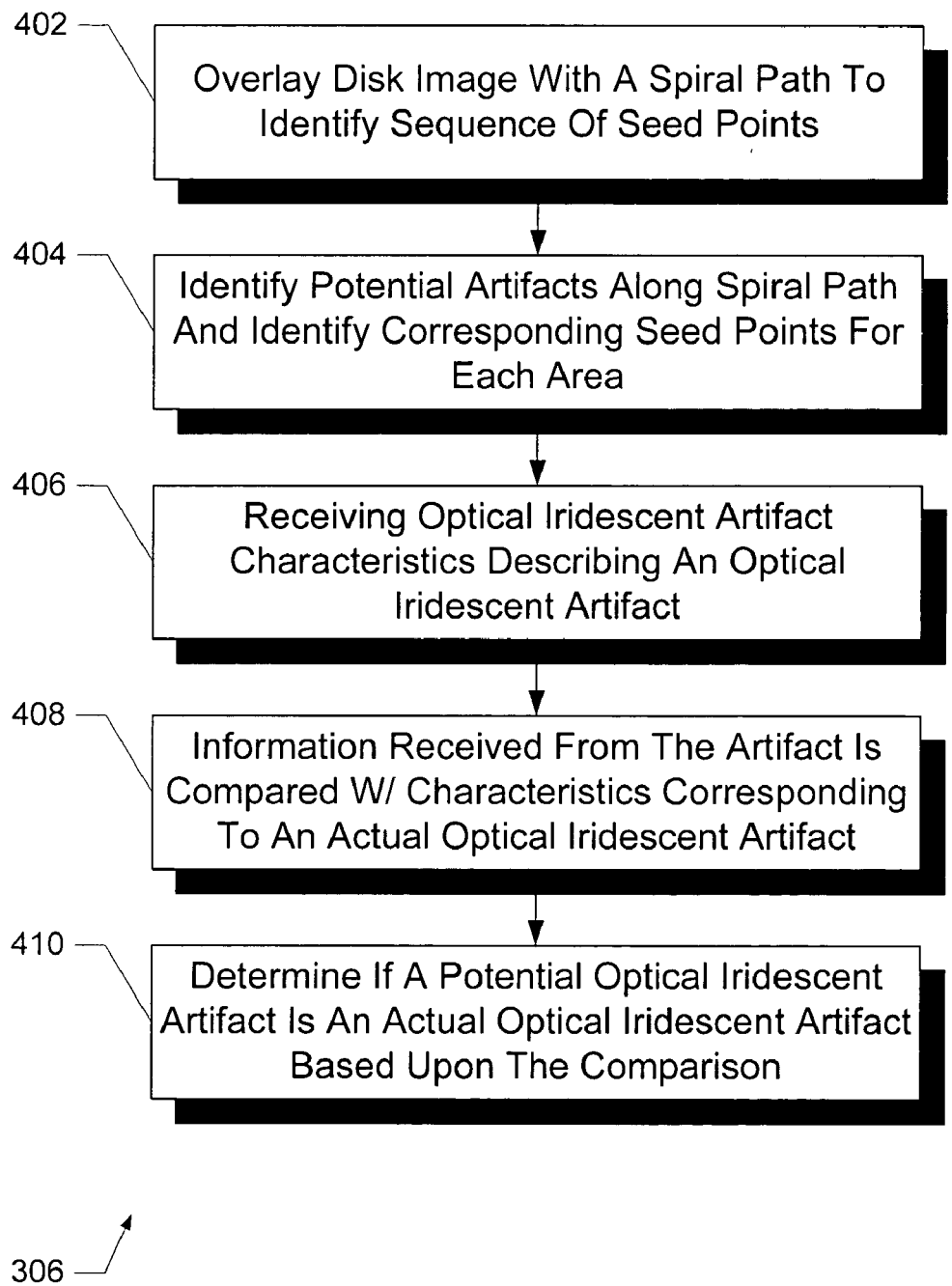
FIG. 4 is a flowchart diagram of the operations for identifying potential optical iridescent artifacts in accordance with one implementation of the present invention.

FIG. 4 is a flowchart diagram of the operations for identifying potential optical iridescent artifacts in accordance with one implementation of the present invention. These operations correspond to step 306 in FIG. 3 in one implementation. If a CD, DVD or other disc is being scanned then a logical spiral path is overlayed on the disk image to identify a sequence of seed points (402). The spiral path typically starts in an inner portion of the disc-like shaped article and moves outward towards edge of the disc-like shaped article. Each seed point is used as a starting point for a group of pixels associated with a potential optical iridescent artifact.

At several points along the logical spiral path, different operations are used to identify areas with potential artifacts and the corresponding seed points for each area (404). Preliminary color analysis and other image processing operations are performed to identify the areas with potential artifacts. These operations include finding areas with colors found outside a color printer gamut, pure colors, colors having a high chromaticity, optically light colors and variations in color that match the optical iridescent artifact. For example, optical iridescent artifacts can be identified by rapid yet smooth transitions between colors in a pattern of colors. Depending on the outcome of these or other operations and tests, the area may be considered an area as potentially having one or more optical iridescent artifacts.

A seed point is selected using the one or two pixels in the identified area and is integral in subsequent processing of the potential artifact area. The seed point location is used as a starting point for an area fill operation when eliminating an optical iridescent artifact. Generally, the specific location of a seed point is selected to identify the largest group of pixels associated with the optical iridescent artifact during a boundary fill or other fill operation. For example, the seed point location may correspond to the pixel that falls in a certain average color range within pixels in the optical iridescent artifact. Alternatively, the seed point location may be selected by identifying the geometric center of the potential optical iridescent artifact area.

Implementations confirm existence of the optical iridescent artifact before further processing. These steps include receiving optical iridescent artifact characteristics describing an optical iridescent artifact (406). This may include receiving information describing the chromaticity, luminosity and hue of the potential optical artifact as well as other color or spatial information.

This information gathered from the scan of the potential optical iridescent artifact is compared with known characteristics corresponding to an actual optical iridescent artifact (408). The actual optical iridescent artifact characteristics include: colors found outside a color printer gamut, pure colors, colors having a high chromaticity, optically light colors and rapid variations in color. For example, if colors from the potential optical iridescent artifact appear to be outside a printer gamut then it is probably not likely that a printer printed the iridescence on article being scanned.

Next, the comparison is used to determine if a potential optical iridescent artifact is an actual optical iridescent artifact (410). While colors found outside the printer gamut tends to indicate an optical iridescent artifact is present, it is not conclusive. A combination of factors is used to make this determination. These other tests include, for example, detecting rapid or unexpected changes in the color on the scanned image; this may indicate that an artifact is present and not printed material or the surface of the disc or artifact. Other tests for identifying an optical iridescent artifact can also be used. In one implementation, these factors are prioritized and weighted with the resulting combination determining the likelihood that an optical iridescent artifact exists.

Figure 5:
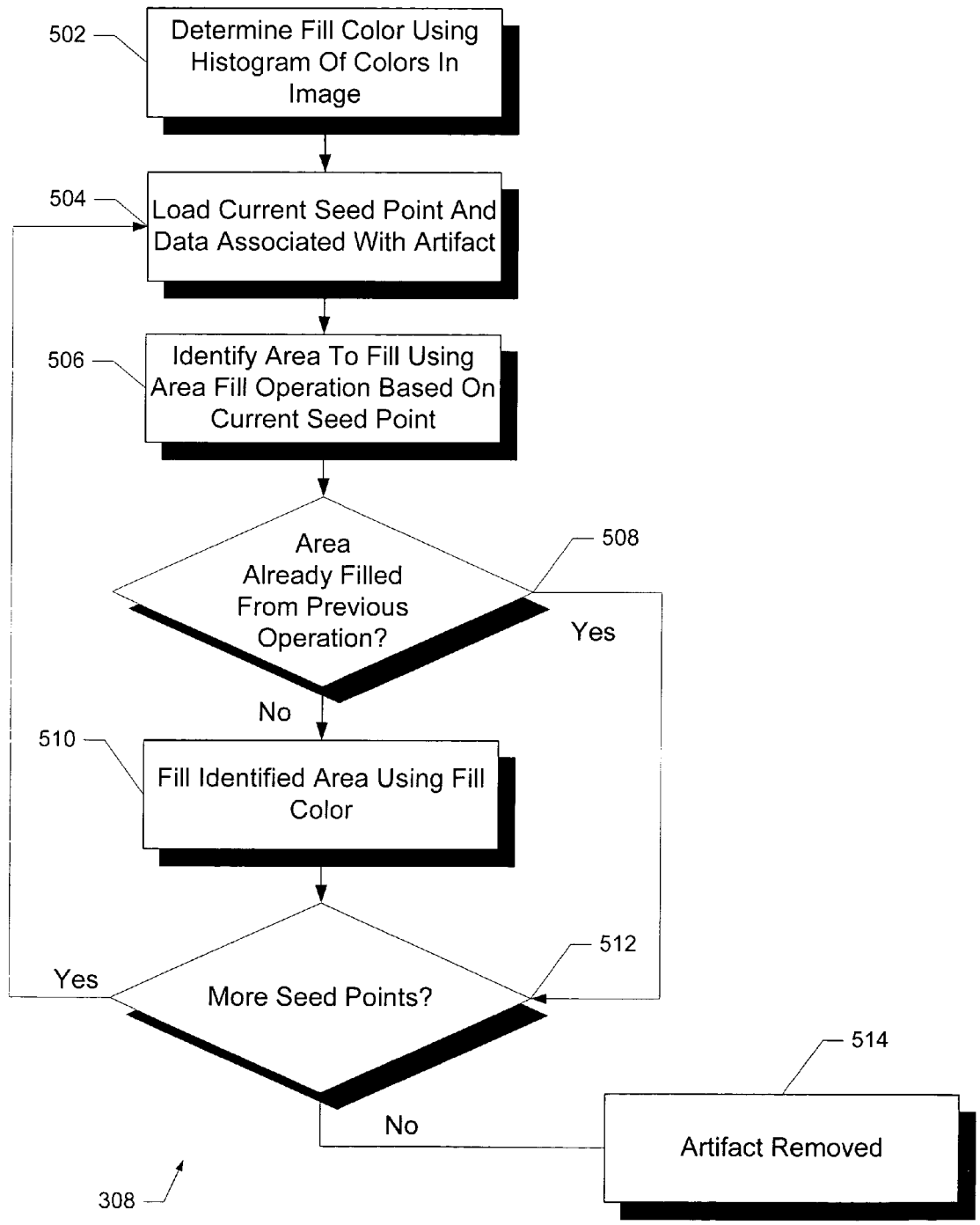
FIG. 5 is a flowchart diagram includes the operations associated with eliminating an area identified as an optical iridescent artifact in accordance with one implementation of the present invention.

Referring to FIG. 5, a flowchart diagram includes the operations associated with eliminating an area identified as an optical iridescent artifact in accordance with one implementation of the present invention. A color is determined for boundary filling the areas of the artifact using a histogram of colors in the image (502). In one implementation, the fill color is selected from the histogram according to an automatic threshold algorithm by Kittler and Illingworth (J. Kittler, J. Illingworth, and J. Föglein. "Threshold selection based on a simple image statistic." Comp. Vision Graph. Image Proc. 30:125-147, 1985). This color can be selected as the color to fill the optical iridescent artifact. Alternatively, a different color in the histogram or a predetermined color that most closely represents the color of a CD without printed material may be used to fill the artifact. For example, a predetermined blue-tint may be used to fill the areas determined to be optical iridescent artifacts.

The filling begins by loading a current seed point for the first optical iridescent artifact (504). In one implementation, the seed point is generally stored on a stack with several other seed points waiting for processing. Using a boundary fill operation, implementations of the present invention determines the area to fill based upon the current seed point obtained from the stack (506). If the area has already been filled by a previous fill operation, another seed point is popped from the stack (512) and the operation repeats. In some cases, this may occur when an optical iridescent artifact overlaps with other artifacts and is removed with previous boundary fill operations.

Alternatively, if the area has not previously been filled, the fill area identified is filled using the predetermined fill color (510). In one implementation, the pixels to be included in the fill area are identified as a region of 4-connected pixels. Further information on boundary fill image processing operations used in the present invention can be found in "Computer Graphics Principles and Practice", by Foley, Van Dam, Feiner and Hughes, 1997 pg. 979-986. Implementations of the present invention modify the boundary fill operation and identify a boundary dynamically rather than by a fixed color; for example a fixed black boundary line. Instead, the boundary is determined as a surrounding color not within the optical iridescent artifact. This color marking the boundary depends on the color detected in comparison with the color of the optical iridescent artifact and is not always black or some other predetermined color or colors. Alternate implementations can use a variety of different boundary fill operations to replace the optical iridescent artifact with a fill color. Once all the seed points have been analyzed and identified areas are filled, the present invention has removed the optical iridescent artifacts in the image and it can be printed or used in subsequent applications (514).

Figure 6:
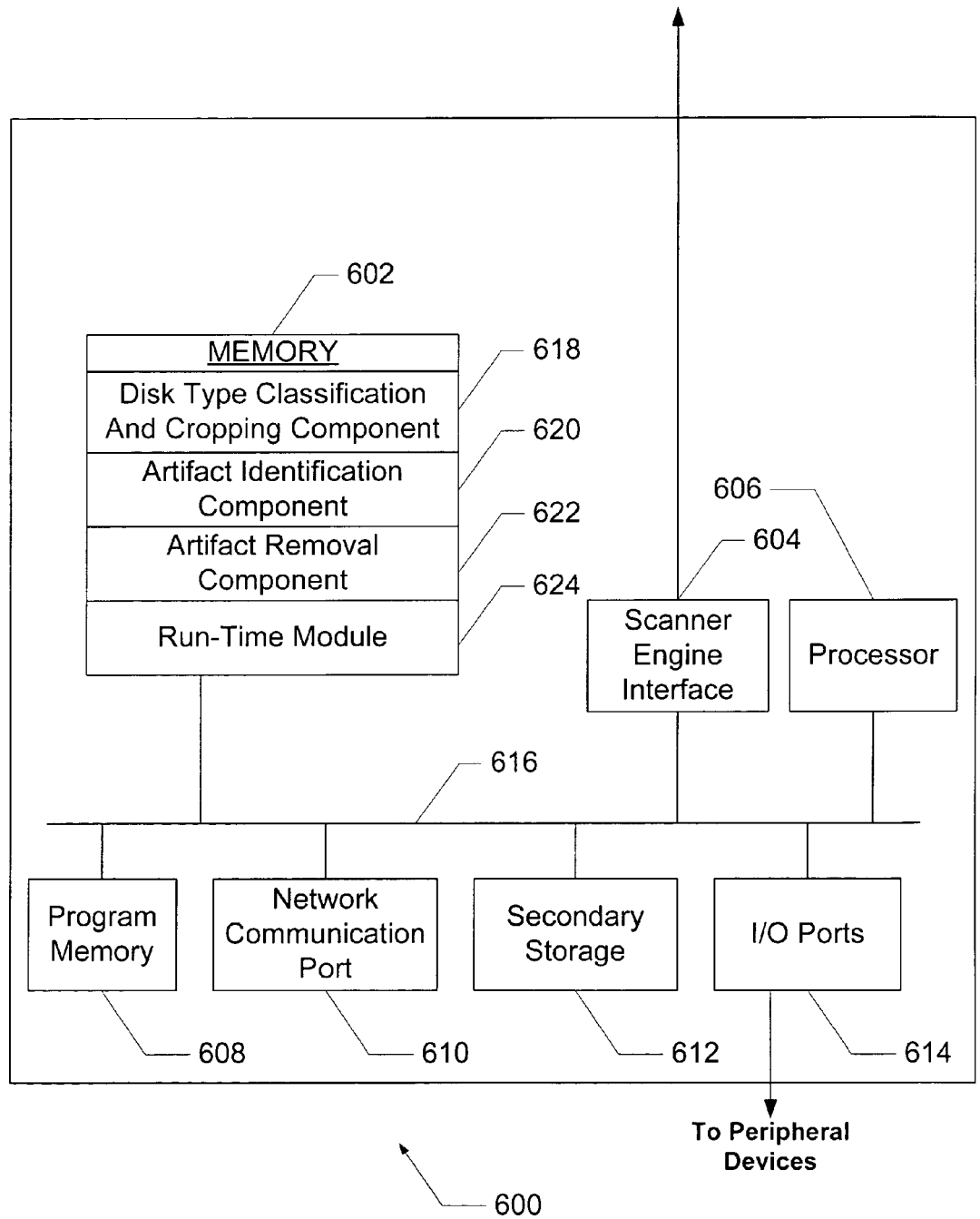
FIG. 6 is a block diagram of a system used by one implementation of the present invention for removing optical iridescent artifacts from an image.

FIG. 6 is a block diagram of a system used by one implementation of the present invention for removing optical iridescent artifacts from an image. In this example system 600 includes a memory 602, typically random access memory (RAM), a scanner engine interface 604, a processor 606, a program memory 608 (for example, read-only memory (ROM) such as a flash ROM), a network communication port 610, a secondary storage 612, audio and I/O ports 614 operatively coupled together over bus 616. System 600 can be preprogrammed, in ROM, for example, or it can be programmed (and reprogrammed) by loading a program from another source (for example, from a floppy disk, a CD-ROM, or another computer).

Once initialized, memory 602 may include one or more aspects of the present invention. In this example, memory 602 includes a disk type classification and cropping component 618 used to identify a disk size and format as well as operations for cropping the disk from an image produced by the scanner. Artifact identification component 620 uses characteristics of optical iridescent artifacts and heuristics for comparing these characteristics with the information gathered in real-time from a scanned image of a CD, DVD or other suitable article. Once the artifact is identified, artifact removal component 622 operates to remove the artifact and replace it with a more suitable color so that the resulting printed output looks appropriate.

While specific embodiments have been described herein for purposes of illustration, various modifications may be made without departing from the spirit and scope of the invention. For example, while implementations of the present invention are described as being useful in scanning CDs, DVDs or other translucent and reflective articles, it is contemplated that the present invention could be applied to images of any article susceptible to generating optical iridescent artifacts when scanned or otherwise exposed to various frequencies of light both in and out of the visible light spectrum. Further, CDs, DVDs, and other storage media types mentioned can be used to store music, video, images and data. The storage media types are not limited to one type of content but can be used to storage any type of digital content as available with the particular software application and/or hardware. Accordingly, the invention is not limited to the above-described implementations, but instead is defined by the appended claims in light of their full scope of equivalents.

What is claimed is:

1. A method of removing optical iridescent artifacts that appear in scanned image of an article having a transparent and reflective surface comprising:
    identifying potential optical iridescent artifacts in the image resulting from the scan using a search pattern on the image of the article;
    confirming through a color analysis operation that the potential optical iridescent artifacts discovered along the search pattern are optical iridescent artifacts and not printed on the article; and
    removing the confirmed iridescent artifacts from the image.

2. The method of claim 1 further comprising:
    printing the image without the iridescent artifacts on a sticker to be secured onto a compact-disc (CD).

3. The method of claim 1 wherein the scanning further comprises:
    identifying a shape of the article using edge detection and image processing operations; and
    cropping the shape of the article away from the remaining area surrounding the article.

4. The method of claim 1 wherein the article is selected from a set of articles including: a compact-disc (CD) and a digital video disc (DVD).

5. The method of claim 1 wherein the side of the article scanned is designed to receive printed material.

6. The method of claim 1 wherein a spiral search pattern is used when the article has a disc-like shape.

7. The method of claim 5 wherein the spiral starts in an inner portion of the disc-like shaped article and moves outward towards edge of the disc-like shaped article.

8. The method of claim 5 wherein a search window covers a set of pixels in the image along the spiral search pattern.

9. The method of claim 1 wherein the color analysis operation further comprises:
    receiving optical iridescent artifact characteristics describing an optical iridescent artifact;
    comparing data gathered on the potential optical iridescent artifact with the characteristics corresponding to the optical iridescent artifact; and
    determining if a potential optical iridescent artifact is an optical iridescent artifact based upon the comparison.

10. The method of claim 9 wherein the optical iridescent artifact characteristics are selected from a set including: colors found outside a color printer gamut, pure colors, colors having a high chromaticity, optically light colors and rapid variations in color.

11. The method of claim 1 wherein the removing further comprising:
    filling areas confirmed as optical artifacts with a predetermined color using boundary fill image processing operations.

12. An apparatus for removing optical iridescent artifacts that appear in scanned image of an article having a transparent and reflective surface, comprising:
    a processor capable of executing instructions:
    a memory holding instructions when executed on the processor instruct a scanner to identify potential optical iridescent artifacts in the image resulting from the scan using a search pattern on the image of the article, confirm through a color analysis operation that the potential optical iridescent artifacts discovered along the search pattern are optical iridescent artifacts and not printed on the article and remove the confirmed iridescent artifacts from the image.

13. The apparatus of claim 12 further comprising instructions when executed:
    print the image without the iridescent artifacts on a sticker to be secured onto a compact-disc (CD).

14. The apparatus of claim 12 wherein the scanning further comprises instructions when executed:
    identify a shape of the article using edge detection and image processing operations; and
    crop the shape of the article away from the remaining area surrounding the article.

15. The apparatus of claim 12 wherein the article is selected from a set of articles including: a compact-disc (CD) and a digital video disc (DVD).

16. The apparatus of claim 12 wherein the side of the article scanned is designed to receive printed material.

17. The apparatus of claim 12 wherein a spiral search pattern is used when the article has a disc-like shape.

18. The apparatus of claim 17 wherein the spiral starts in an inner portion of the disc-like shaped article and moves outward towards edge of the disc-like shaped article.

19. The apparatus of claim 17 wherein a search window covers a set of pixels in the image along the spiral search pattern.

20. The apparatus of claim 12 wherein the color analysis operation further comprises instructions when executed:
    receive optical iridescent artifact characteristics describing an optical iridescent artifact;
    compare data gathered on the potential optical iridescent artifact with the characteristics corresponding to the optical iridescent artifact; and
    determine if a potential optical iridescent artifact is an optical iridescent artifact based upon the comparison.

21. The apparatus of claim 20 wherein the optical iridescent artifact characteristics are selected from a set including: colors found outside a color printer gamut, pure colors, colors having a high chromaticity, optically light colors and rapid variations in color.

22. The apparatus of claim 12 wherein the instructions that remove further comprise instructions that:
fill areas confirmed as optical artifacts with a predetermined color using boundary fill image processing operations.

23. An apparatus for removing optical iridescent artifacts that appear in an image, comprising:
means for scanning an article having a transparent and reflective surface to create the image;
means for identifying potential optical iridescent artifacts in the image resulting from the scan using a search pattern on the image of the article;
means for confirming through a color analysis operation that the potential optical iridescent artifacts discovered along the search pattern are optical iridescent artifacts and not printed on the article; and
means for removing the confirmed iridescent artifacts from the image.

24. A computer program product, tangibly stored on a computer readable medium, for removing optical iridescent artifacts that appear in scanned image of an article having a transparent and reflective surface, comprising instructions operable to cause a programmable processor to:
identify potential optical iridescent artifacts in the image resulting from the scan using a search pattern on the image of the article;
confirm through a color analysis operation that the potential optical iridescent artifacts discovered along the search pattern are optical iridescent artifacts and not printed on the article; and
remove the confirmed iridescent artifacts from the image.

* * * * *